United States Patent [19]

Saridakis

[11] 4,202,789
[45] May 13, 1980

[54] POSITIVE COBALT ELECTRODE FOR ALKALINE STORAGE BATTERIES AND PROCESS FOR ITS PRODUCTION

[75] Inventor: Nikolaus Saridakis, Brunswick, Fed. Rep. of Germany

[73] Assignee: Volkswagenwerk Aktiengesellschaft, Wolfsburg, Fed. Rep. of Germany

[21] Appl. No.: 919,828

[22] Filed: Jun. 28, 1978

[30] Foreign Application Priority Data

Jul. 9, 1977 [DE] Fed. Rep. of Germany ....... 2731063

[51] Int. Cl.² ...................... H01M 4/48; C01G 51/04
[52] U.S. Cl. ................................ 252/182.1; 252/518; 423/138; 429/218
[58] Field of Search ..................... 252/182.1, 513, 518; 429/218; 423/138

[56] References Cited

U.S. PATENT DOCUMENTS

| 3,382,106 | 5/1968 | Jung et al. | 252/182.1 |
| 3,945,848 | 3/1976 | Pey et al. | 429/218 |
| 3,986,892 | 10/1976 | Ewp et al. | 429/218 |

FOREIGN PATENT DOCUMENTS

| 1920282 | 11/1970 | Fed. Rep. of Germany. |
| 2524774 | 9/1976 | Fed. Rep. of Germany. |
| 51-74242 | 6/1976 | Japan ................................ 252/182.1 |

Primary Examiner—Richard E. Schafer
Assistant Examiner—Irwin Gluck
Attorney, Agent, or Firm—Brumbaugh, Graves, Donohue & Raymond

[57] ABSTRACT

A positive cobalt electrode for alkaline storage batteries formed to contain aluminum hydroxide. A porous supporting grid of conducting material is immersed in an impregnating solution containing a cobalt salt dissolved in a solvent and at least one aluminum salt in solution. The grid is subsequently immersed in an alkaline medium where the hydroxides are precipitated.

15 Claims, No Drawings

POSITIVE COBALT ELECTRODE FOR ALKALINE STORAGE BATTERIES AND PROCESS FOR ITS PRODUCTION

BACKGROUND OF THE INVENTION

The present invention is a positive cobalt electrode for alkaline storage batteries, and a process for producing the same.

In alkaline storage batteries, particularly those used as the principal drive batteries in electrical vehicle drives, cobalt electrodes are commonly used as the negative electrodes. Nickel electrodes, however, rather than cobalt electrodes, are normally used as the positive battery electrodes. The methods of forming a nickel electrode for use in a battery, however, are usually quite time consuming, energy consuming and costly. According to one such method, a porous supporting grid formed of a conductor material is repeatedly impregnated with a solution containing nickel salts and a small quantity of cobalt salt, followed by immersion in an alkaline medium for precipitating the hydroxides. In addition, the ampere-hour capacities of positive nickel electrodes formed according to these heretofore known methods tend to be relatively low.

SUMMARY OF THE INVENTION

The present invention is a novel positive cobalt electrode, along with a process for producing such an electrode which is simple, inexpensive, time and energy efficient, and which produces an electrode having a high ampere-hour capacity and a long service life.

An electrode according to this invention exhibits these improved characteristics due to the fact that it is formed to contain aluminum hydroxide. A porous supporting grid of electrically conductive material, which preferably consists of a nickel grid, is immersed in an impregnating solution containing a cobalt salt dissolved in a solvent and at least one aluminum salt in solution. Thereafter, the grid is immersed in an alkaline medium and the hydroxides precipitated. This method is similar to the previously described known chemical impregnation method for the preparation of positive nickel electrodes, but for the substitution of a cobalt salt, and the introduction of an aluminum salt into the impregnating solution. The inclusion of at least one aluminum salt not only facilitates the preparation of the cobalt electrode as such, but at the same time ensures that the positive cobalt electrodes produced exhibit excellent ampere-hour capacities. The voltage setting of the cobalt electrodes prepared in this manner is also very favorable, and in continuing laboratory tests such electrodes have been cycled through charge and discharge cycles more than 1000 times without any change in the condition of the electrode, demonstrating their capability of long service life. The method of forming these electrodes is also relatively simple, inexpensive, and time- and energy-saving. Thus, these electrodes are an attractive alternative to conventional positive nickel electrodes for use in alkaline storage batteries, and in particular in batteries used in electrical vehicle drives.

DETAILED DESCRIPTION OF THE INVENTION

In accordance with this invention, a porous supporting grid of a conducting material is immersed in an impregnating solution of about 50° to 60° C. several times for periods of approximately 5 minutes each. The impregnating solution contains a cobalt salt dissolved in a solvent, and an aluminum salt, for example aluminum chloride and/or aluminum nitrate solution at a density of about 1.2 g/cm$^3$ in a proportion of up to 1 cm$^3$, preferably 0.35 to 0.7 cm$^3$ of aluminum salt solution per 1 g of the cobalt salt.

It is preferable that the solvent used for the impregnating solution is one having a low surface tension, preferably acetone and/or ethanol. However, methanol or acetaldehyde may also be used. It has also been found advantageous that the impregnating solution contain a glucose solution having a density of about 1.1 g/cm$^3$, added in a proportion of up to 0.25 cm$^3$ per 1 g of the cobalt salt. Instead of glucose, a higher alcohol may also be used. Finally, it is advantageous if the impregnating solution also contains a small amount of a nickel salt, preferably from 2.5 to 10 parts by weight of nickel salt per 100 parts by weight of cobalt salt.

The following are two examples of positive cobalt electrodes prepared and tested on the laboratory scale, demonstrating the excellent results obtained with the electrodes produced by the method according to the present invention.

EXAMPLE 1

The supporting grid used for the preparation of a positive cobalt electrode consisted of a thin rectangular plate made of nickel sponge, produced by the DAUG Company, Esslingen, West Germany. The grid had a cross-sectional area of 7.25 cm$^2$ and an initial weight in the dry state of 1.8 g. The grid was immersed 3 times, for 5 minute periods with 5 minute pauses between immersions, in an impregnating solution having a temperature about 50° to 60° C. The solution contained 5 grams of cobalt nitrate (Co(NO$_3$)$_2$.6H$_2$O) dissolved in 2 cm$^3$ of acetone. The solution also contained 2 cm$^3$ of a solution of aluminum chloride (AlCl$_3$) in distilled water, having a density of 1.275 g/cm$^3$.

The grid was, within 30 minutes after the last impregnation, then immersed in a alkaline medium, for example an aqueous solution of potassium hydroxide or sodium hydroxide and/or lithium hydroxide, having a temperature between 40° and 80° C., for a period of time of approximately 30 minutes, for precipitation of the hydroxides. After precipitation, the electrode weighed about 3.6 g in the wet state, and upon a one hour discharge exhibited a specific ampere-hour capacity of 95 Ah/kg (ampere-hours per kilogram).

EXAMPLE 2

The electrically conductive supporting grid used in this example was a thin rectangular plate of nickel sponge, having a cross-sectional area of 46.92 cm$^2$, and a weight of 12 g in the dry state. This nickel grid was subjected to two 5 minute impregnations with an impregnating solution containing 35 g of cobalt nitrate dissolved in 14 cm$^3$ of acetone, 14 cm$^3$ of an aluminum chloride solution with a density of 1.275 g/cm$^3$, and 3.5 cm$^3$ of a solution of glucose in distilled water with a density of 1.075 g/cm$^3$. After the first impregnation, the weight of the nickel grid had increased to 22.55 g, and increased only slightly to 22.90 g during the second impregnation, indicating that a single impregnation was sufficient. After precipitation of the hydroxides by immersion for approximately 30 minutes in an aqueous solution of potassium hydroxide and lithium hydroxide, the electrode weighted 24.1 g in the wet state. Upon a one hour discharge, the electrode exhibited a specific ampere-hour capacity of 101 Ah/kg.

In determining the electrical properties of the positive cobalt electrodes in Examples 1 and 2, they were assembled with known negative electrodes, e.g. negative cobalt electrodes, in storage battery cells. In such tests, which are continuing, the electrodes have been subjected so far to greater than 1000 cycles of one hour discharges and approximately 1.3 hour charges without any change compared to the initial state of the electrode. This fact, together with the very high specific ampere-hour capacities attained at favorable voltage settings, and the simple, inexpensive and time/energy efficient mode of preparation, demonstrates the marked suitability of such positive cobalt electrodes for use in efficient alkaline storage batteries of long service life. The use of positive cobalt electrodes prepared according to this invention as an alternative to conventional nickel electrodes is also desirable from the point of view of the growing scarcity of raw materials needed for the latter.

The aforegoing represents a preferred method of forming a positive cobalt electrode according to the present invention. Various modifications and substitutions will be apparent to those skilled in the art. Thus for example, although cobalt electrodes described in the above two examples were prepared by immersion of the supporting grid in a cobalt nitrate solution, it is self evident that instead of cobalt nitrate another cobalt salt such as cobalt chloride could be substituted in the impregnating solution. This, as well as other apparent modifications and substitutions, are intended to be part of this invention as contained in the following claims.

I claim:

1. A cobalt electrode for use as a positive electrode in alkaline storage batteries, said electrode containing aluminum hydroxide.

2. A process for the production of a positive cobalt electrode for alkaline storage batteries comprising the steps of immersing a porous supporting grid of conducting material in an impregnating solution containing a cobalt salt dissolved in a solvent and at least one aluminum salt in solution, and subsequently immersing said grid in an alkaline medium for precipating out hydroxides.

3. A process according to claim 2, wherein the aluminum salt comprises aluminum chloride.

4. A process according to claim 2, wherein the aluminum salt comprises aluminum nitrate.

5. A process according to claim 2, 3, or 4, wherein the aluminum salt solution has a density of approximately 1.2 g/cm$^3$, and is added in an amount up to 1 cm$^3$ per 1 g of the cobalt salt.

6. A process according to claim 2, 3, or 4, wherein the aluminum salt solution has a density of approximately 1.2 g/cm$^3$, and is added in an amount between 0.35 and 0.7 cm$^3$ per 1 g of the cobalt salt.

7. A process according to claim 2, wherein said solvent has a low surface tension.

8. A process according to claim 7, wherein said solvent is acetone.

9. A process according to claim 8, wherein said solvent is ethanol.

10. A process according to claim 2, wherein said impregnating solution comprises glucose.

11. A process according to claim 10, wherein said glucose solution has a density of about 1.1 g/cm$^3$, and is added in an amount up to 0.25 cm$^3$ per 1 g of the cobalt salt.

12. A process according to claim 2, wherein said impregnating solution comprises a higher alcohol.

13. A process according to claim 2, wherein said impregnating solution contains a small amount of a nickel salt.

14. A process according to claim 13, wherein said impregnating solution contains between 2.5 and 10 parts by weight of nickel salt per 100 parts by weight cobalt salt.

15. A process according to claim 2, wherein said solvent has a low surface tension, and said impregnating solution further comprises glucose, a higher alcohol, and a small amount of a nickel salt.

* * * * *